(No Model.)
T. J. DEWEES.
ELECTRIC CABLE.
No. 515,822.  Patented Mar. 6, 1894.
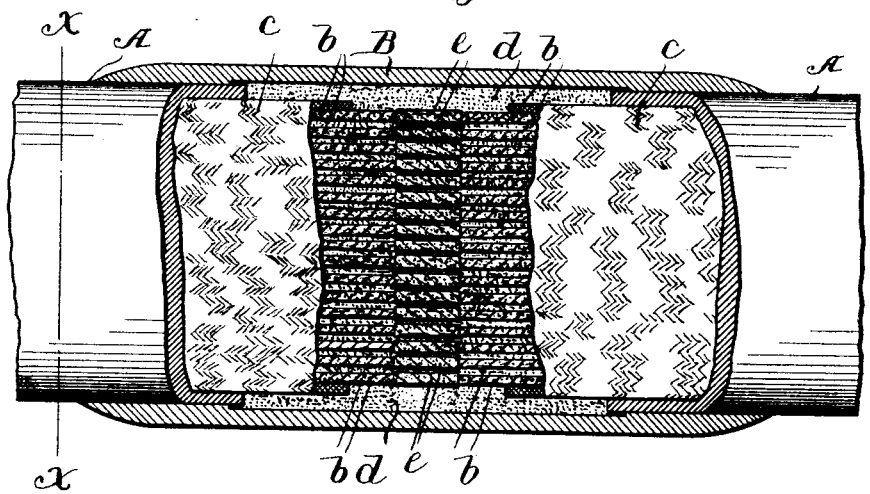
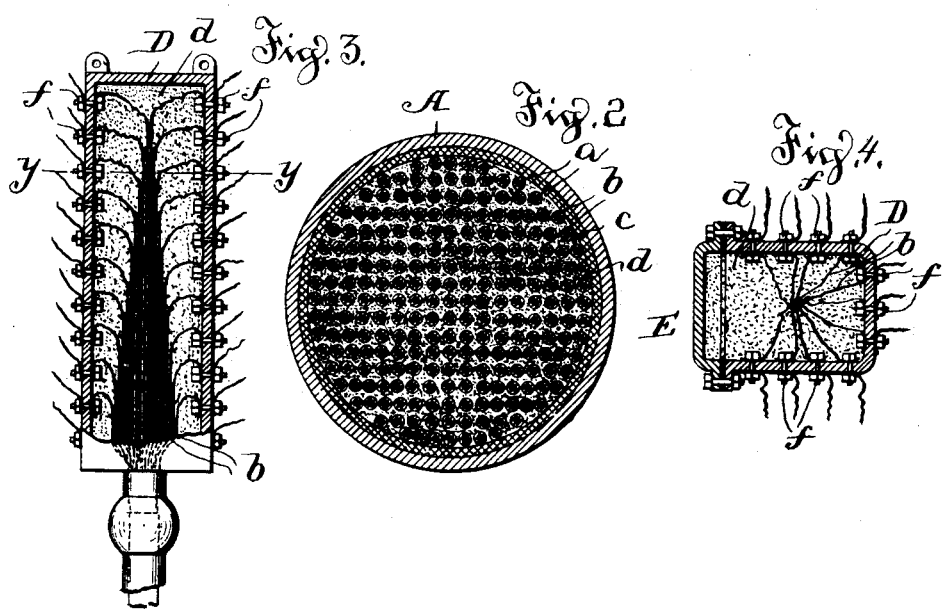
Witnesses:
Jesse B. Heller.
Inventor.
Thomas J. Dewees
By
Attorney.

UNITED STATES PATENT OFFICE.

THOMAS J. DEWEES, OF PALMYRA, NEW JERSEY, ASSIGNOR TO THE ELECTRIC CABLE CONSTRUCTION AND MAINTENANCE COMPANY, OF PENNSYLVANIA.

ELECTRIC CABLE.

SPECIFICATION forming part of Letters Patent No. 515,822, dated March 6, 1894.

Application filed December 15, 1893. Serial No. 493,753. (No model.)

*To all whom it may concern:*

Be it known that I, THOMAS J. DEWEES, of Palmyra, Burlington county, New Jersey, have invented an Improvement in Electric Cables and in Methods of Making the Same, of which the following is a specification.

My invention relates to electric cables and to the method of making the same; and consists of certain improvements which are fully set forth in the following specification and shown in the accompanying drawings which form a part thereof.

More particularly my invention relates to dry cables in which the insulated wire or wires are dried at the time of being introduced into or incased in the inclosing casing, or previously thereto, to expel the moisture, and is designed to more effectively dry the insulated wires and to maintain them in such dry condition.

My improvements are applicable both to the body of the cable or conductor and to the splices or joints formed therein, and also to the terminal boxes or cases in which the wires of the cable are connected with the external wires.

It is particularly difficult to maintain a thorough dryness in the splices of the cables and at the terminal connections, as even the humidity of the atmosphere, the breath, or the moisture of the hands of the workman when connecting the wires will be sufficient to affect the insulation resistance of the cable or conductor and thereby reduce its efficiency.

My improved construction enables the cables or wires at the splice or point of connection to be thoroughly dried and to be maintained in a thoroughly dry condition after the splice covering or sleeve has been applied and hermetically sealed.

In carrying out my invention I apply to the cable or conductor, preferably after it has been dried in the usual manner, a moisture absorbing medium, such as powdered calcined lime, or an equivalent substance having a strong affinity for water, which operates to absorb any moisture that may remain in the fibrous coverings of the wire or wires after they have been dried by the usual methods, or any moisture that may be communicated to them upon exposure as in the making of a splice or terminal connection, or through breaks or leaks in the sealed casing or covering. This lime or equivalent powder quickly absorbs any moisture that may be present and maintains the cable or conductor insulation in a dry condition. To obtain the fullest effect of the lime, or equivalent moisture absorbing medium, it should be introduced throughout the spaces between the insulated coverings of the wires as well as about the cable proper as an entirety.

In the accompanying drawings: Figure 1 is a longitudinal view of an electric cable having a spliced portion shown in section and embodying my invention. Fig. 2 is a transverse sectional view on the line $x$—$x$ of Fig. 1 illustrating my improvements as applied to the body of the cables. Fig. 3 is a plan view of a terminal box with the cover removed illustrating my invention as applied to the wires therein; and Fig. 4 is a transverse vertical sectional view of the same on the line $y$—$y$ of Fig. 3 with the cover attached.

It will be understood that my invention may be applied to a cable or conductor of any construction and is not limited to application to the particular construction shown. The cable shown is composed of a series of wires $a$ having an insulated covering $b$ of fibrous material formed into a bunch and inclosed in a fibrous covering $c$, the whole being incased in a tightly fitting sheath A of lead or other metal. The cable is rendered anhydrous, preferably by heating the insulation both of the single wires and of the bunch or strand of wires and also of the lead covering while the cable is being constructed. During the process of forming the dry cable in this or any other suitable manner, the powdered lime, or equivalent absorptive powder, is applied, being introduced so as to lie about the cable and as far as convenient within the spaces between the separate insulated wires which compose it. The powdered lime is indicated by the reference letter $d$ in the drawings. In practice I prefer to wrap each wire making up the cable with dry paper or cloth which may be dusted during the wrapping process with the lime powder, and the series of wires so wrapped may be gathered into a strand or bunch and tied together by a textile or fibrous covering such as *c* which may be formed of braided threads; and if desired during this latter process in the formation of the cable additional powdered lime may be applied so as to more or less fill the interstices as before set out. All of this process would take place preferably in a heated and dry atmosphere, and in such atmosphere the outer metallic sheath or casing may be applied. It is also evident that the cable proper may be completed if desired and then thoroughly dried and the lime powder applied before inclosing it in the metal sheath or case.

It is immaterial to my invention how the cable proper may be formed as my improvements relate more particularly to the method and means of eliminating the last portions of the moisture. Broadly considered the lime might be applied to a cable not previously dried and hermetically sealed in the inclosing sheath or casing. In the splice shown in Fig. 1 the powdered lime is applied in substantially the same manner. In making the splice the ends of the separate wires are exposed and united in pairs and the splice coverings *e* are applied. The lime or equivalent powder is sprinkled between the spliced wires and about the cable, and the splice covering or joint is secured in place and hermetically sealed. The splice covering B is usually a piece of lead tubing of larger diameter than the lead tubing forming the sheath or casing of the cable, and its ends are united to the sheaths or casing of the cable ends by the usual wiped joint customary in plumbing. If desired the splice may be heated to expel the moisture as far as possible before the powder is applied. The powder may also be applied within the splice coverings *e* which cover the united ends of the individual wires. In fact it may be applied in any way so that it is in position to absorb the moisture.

In practice the ends of the cable before the splice is made are necessarily exposed, and, if desired, to prevent moisture entering, these ends may be sealed with any suitable plastic substance impervious to moisture.

In Figs. 3 and 4 my invention is shown applied to the insulated conductors, wires or cables within the terminal case or box D. The terminal box or casing may be of any construction, that shown being selected merely for purposes of illustration. E is the lid or cover of the terminal box, which may be removed to permit the connection of the conductors *a* with the binding posts or contacts *f* in the usual manner. The lime, or absorptive powder *d* is applied as has been explained and the cover E is attached. The terminal connections of the wires or conductors may thus be kept dry, and such moisture as finds its way into the insulated coverings when the connections are being made is absorbed.

The powder may be applied as well to a single insulated conductor as to a cable composed of a series of bunched insulated wires. I prefer to use powdered lime as the moisture absorbing medium, as experiment has demonstrated that it is best suited for the purpose intended, but instead of lime other substances which have a high absorptive quality, such as powdered magnesia or magnesite may be employed. To accomplish the full measure of the invention the powder must be one having the power of absorbing moisture in a suspended or vaporized condition and not merely in a liquid form.

By my improvements the insulation resistance of the cable can be made very high and far above that possible with any other method of insulation.

Having now described my invention, what I claim as new, and desire to secure by Letters Patent, is—

1. The herein described method of constructing electric cables which consists in drying the fibrous insulating covering of the wire or wires to expel the moisture therefrom, applying a moisture absorbing medium, such as powdered lime, to the dried insulating covering to absorb such moisture as may remain therein, and finally inclosing the dried fibrous covered wire or wires with the moisture absorbing medium in a closed sheath or covering.

2. An electric conductor or cable having a fibrous insulation from which the moisture has been expelled, powdered with a moisture absorbing medium such as powdered lime, and a closed sheath or covering hermetically sealing the fibrous insulation in its dried and powdered condition.

3. A splice for an electric cable consisting of the combination of the two cable ends each composed of one or more insulated wires, and an outer metallic sheath or casing, and in which the ends of the wires of the two cable ends are electrically united, an insulating covering over the united ends of the wires, a moisture absorbing substance such as lime applied to the cables at their union, and a splice sleeve or covering united to the ends of the metallic sheaths of the two cables so as to form a hermetically sealed splice.

4. An electric cable consisting of an outer closed sheath, a bunch of wires having dried insulated coverings within the outer closed sheath, and a powdered moisture absorbing medium such as powdered lime within the closed outer sheath and in the spaces between the dried insulated wires.

5. An electric conductor or cable consisting of one or more electric conductors having a porous insulation, an outer inclosing sheath or case, and a moisture absorbent material such as lime within the sheath or case and in contact with the insulation of the wire or wires.

6. An insulated electric conductor having a moisture absorbing material such as lime applied to its insulating covering.

7. The combination of an electric cable composed of insulated wires, an outer casing into which the ends of the insulated wires extend, electrical connections with said wires within the outer casing, and a moisture absorbing material such as lime applied to said wires at their union with the electrical connections within the casing.

In testimony of which invention I have hereunto set my hand.

THOMAS J. DEWEES.

Witnesses:
ERNEST HOWARD HUNTER,
H. L. MOTHERWELL.